(12) United States Patent
Kawai et al.

(10) Patent No.: US 11,342,590 B2
(45) Date of Patent: May 24, 2022

(54) SECONDARY BATTERY

(71) Applicant: Murata Manufacturing Co., Ltd., Nagaokakyo (JP)

(72) Inventors: Toru Kawai, Nagaokakyo (JP); Masahiro Otsuka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 128 days.

(21) Appl. No.: 16/157,335

(22) Filed: Oct. 11, 2018

(65) Prior Publication Data

US 2019/0044188 A1 Feb. 7, 2019

Related U.S. Application Data

(63) Continuation of application No. PCT/JP2017/007222, filed on Feb. 24, 2017.

(30) Foreign Application Priority Data

May 31, 2016 (JP) .............................. JP2016-109170

(51) Int. Cl.
*H01M 10/0585* (2010.01)
*H01M 50/10* (2021.01)
(Continued)

(52) U.S. Cl.
CPC ....... *H01M 10/0585* (2013.01); *H01M 4/131* (2013.01); *H01M 4/133* (2013.01); *H01M 10/0525* (2013.01); *H01M 50/10* (2021.01)

(58) Field of Classification Search
None
See application file for complete search history.

(56) References Cited

U.S. PATENT DOCUMENTS

2013/0157110 A1* 6/2013 Kanai .................. H01M 2/266
429/153
2015/0086842 A1 3/2015 Kang et al.

FOREIGN PATENT DOCUMENTS

JP H0256856 A 2/1990
JP H0982361 A 3/1997
(Continued)

OTHER PUBLICATIONS

International Search Report issued for PCT/JP2017/007222, dated May 23, 2017.
(Continued)

*Primary Examiner* — Brian R Ohara
(74) *Attorney, Agent, or Firm* — ArentFox Schiff LLP

(57) ABSTRACT

A secondary battery which includes an electrode assembly having a positive electrode, a negative electrode, and a separator disposed between the positive electrode and the negative electrode, and an electrolyte, the electrode assembly and the electrolyte being accommodated in an exterior body. The positive electrode and the negative electrode have curved surfaces adjacent to each other on parts of peripheral surfaces in a planar view. The negative electrode is disposed so as to protrude from the positive electrode so that a gap G is present between the positive electrode and the negative electrode in the planar view. A value ($|R_1-R_2|/G$) obtained by dividing an absolute value $|R_1-R_2|$ of a difference between a curvature radius $R_1$ of the curved surface of the negative electrode and a curvature radius $R_2$ of the curved surface of the positive electrode by the gap G is 0.50 to 1.10.

12 Claims, 4 Drawing Sheets

(51) Int. Cl.
*H01M 4/131* (2010.01)
*H01M 4/133* (2010.01)
*H01M 10/0525* (2010.01)

(56) References Cited

FOREIGN PATENT DOCUMENTS

| | | | |
|---|---|---|---|
| JP | 2000285881 | A | 10/2000 |
| JP | 2013134881 | A | 7/2013 |
| JP | 2014049371 | A | 3/2014 |
| JP | 2015519691 | A | 7/2015 |
| JP | 2016502742 | A | 1/2016 |

OTHER PUBLICATIONS

Written Opinion of the International Searching Authority issued for PCT/JP2017/007222, dated May 23, 2017.

* cited by examiner

FIG. 4(a) <Pattern curved in outward direction>
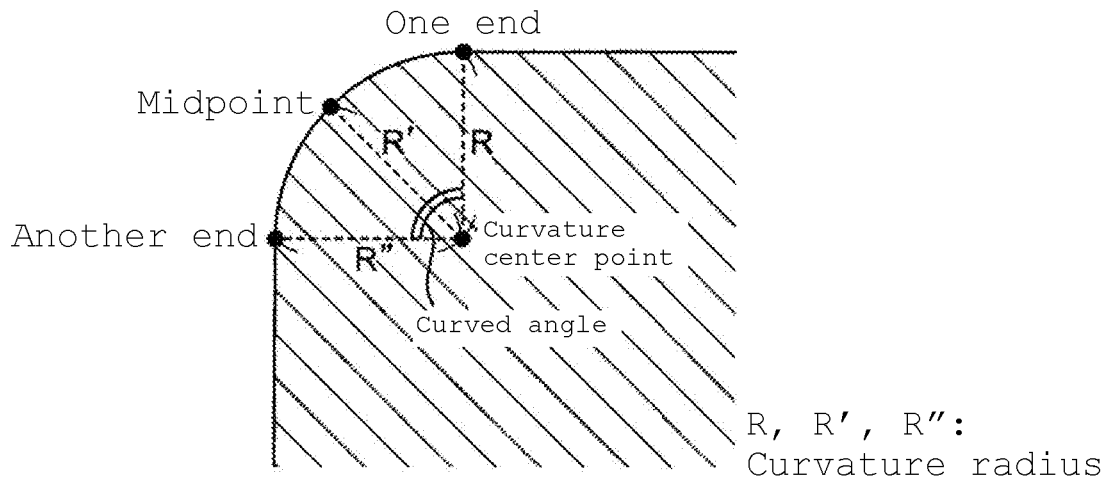
FIG. 4(b) <Pattern curved in inward direction>
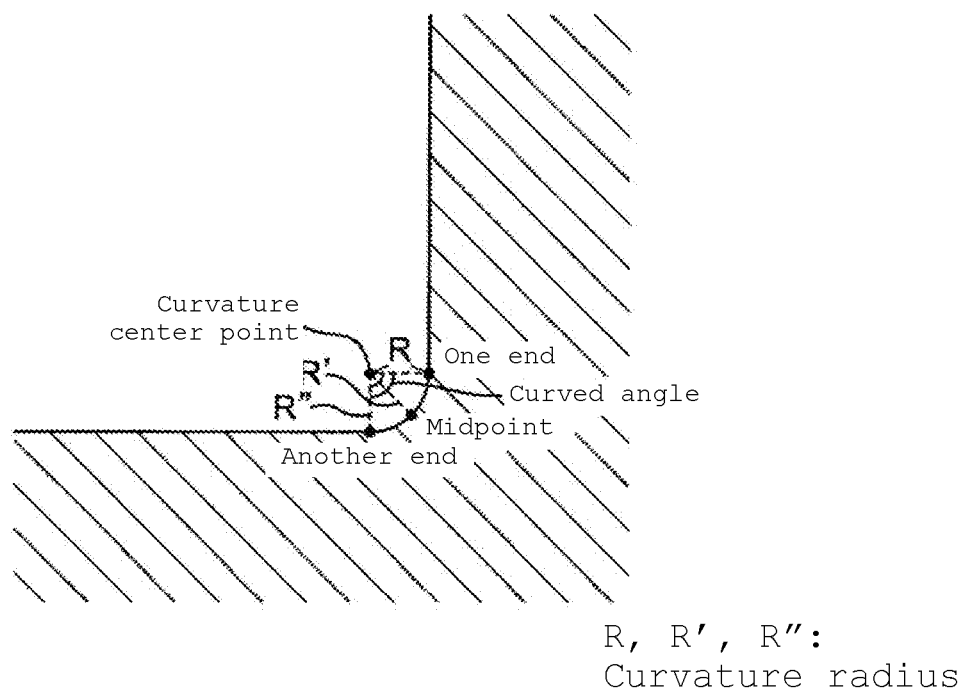

SECONDARY BATTERY

CROSS REFERENCE TO RELATED APPLICATIONS

The present application is a continuation of International application No. PCT/JP2017/007222, filed Feb. 24, 2017, which claims priority to Japanese Patent Application No. 2016-109170, filed May 31, 2016, the entire contents of each of which are incorporated herein by reference.

FIELD OF THE INVENTION

The present invention relates to a secondary battery.

BACKGROUND OF THE INVENTION

Secondary batteries that can be repeatedly charged and discharged have been used for various applications. For example, the secondary battery is used as a power source for electronic devices such as smartphones and laptop computers.

The secondary battery has a structure in which an electrode assembly and an electrolyte are accommodated and enclosed in an exterior body. The electrode assembly includes a positive electrode, a negative electrode, and a separator disposed between the positive electrode and the negative electrode. As a type of the electrode assembly, there is a type having a planar stacked structure in which a plurality of electrode units each including a positive electrode, a negative electrode, and a separator is stacked. Further, the positive electrode and the negative electrode have curved surfaces adjacent to each other on a part of the peripheral surface in a planar view from a principal surface of the exterior body. In this case, the negative electrode is disposed so as to protrude from the positive electrode so that a gap is formed between the positive electrode and the negative electrode in the planar view.

Patent Document 1: Japanese Patent Application Laid-Open No. 2016-502742
Patent Document 2: Japanese Patent Application Laid-Open No. 2015-519691

SUMMARY OF THE INVENTION

However, when the gap between the positive electrode and the negative electrode in the planar view is relatively large, a portion that is not used as the negative electrode increases, and as a result, the energy density of the secondary battery may decrease.

An object of the present invention is to provide a secondary battery capable of suppressing a reduction in energy density.

In order to achieve the above object, according to the present invention, there is provided a secondary battery including an electrode assembly including a positive electrode, a negative electrode, and a separator disposed between the positive electrode and the negative electrode, and an electrolyte, the electrode assembly and the electrolyte being accommodated in an exterior body, where the positive electrode and the negative electrode have curved surfaces adjacent to each other on parts of peripheral surfaces in the planar view, the negative electrode is disposed so as to protrude from the positive electrode so that a gap G is present between the positive electrode and the negative electrode in the planar view, a value ($|R_1-R_2|/G$) obtained by dividing an absolute value $|R_1-R_2|$ of a difference between a curvature radius $R_1$ of the curved surface of the negative electrode and a curvature radius $R_2$ of the curved surface of the positive electrode by the gap G is 0.50 to 1.10.

According to the present invention, it is possible to suppress a reduction in energy density. Therefore, according to the present invention, it is possible to suitably exert the function of the secondary battery.

BRIEF EXPLANATION OF THE DRAWINGS

FIGS. 4(*a*) and 4(*b*) are schematic views each showing a concept of a curvature center point.

DETAILED DESCRIPTION OF THE INVENTION

Figure 1:
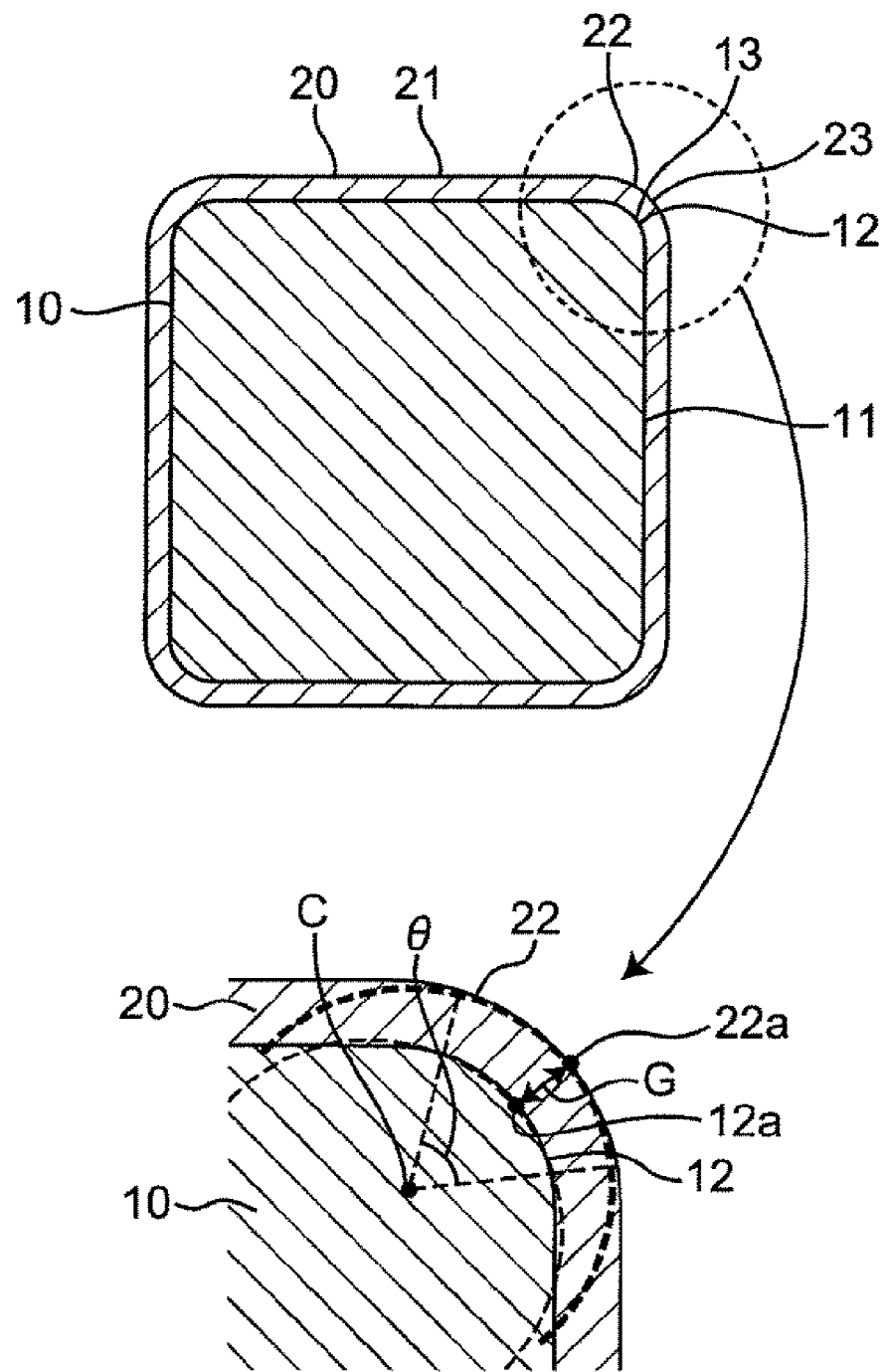
FIG. 1 is a schematic plan view showing a positional relationship between positive and negative electrodes as constituent elements of a secondary battery according to an embodiment of the present invention in planar view.

Hereinafter, a secondary battery according to an embodiment of the present invention will be described. The term "secondary battery" in the present specification means a battery that can be repeatedly charged and discharged. The term "secondary battery" is not excessively limited by its name, and can include, for example, "an electric storage device". Further, the term "in planar view" in the present specification refers to a state when an object (e.g., a secondary battery) is placed and viewed from directly above the thickness (height) direction. First, before describing "the characteristic part" of the secondary battery according to an embodiment of the present invention, the basic configuration of the secondary battery according to an embodiment of the present invention will be described.

[Configuration of Secondary Battery According to an Aspect of the Present Invention]

The secondary battery according to an embodiment of the present invention has a structure in which an electrode assembly and an electrolyte are accommodated and enclosed in an exterior body. The electrode assembly includes a positive electrode, a negative electrode, and a separator disposed between the positive electrode and the negative electrode. In an embodiment of the present invention, the type of the electrode assembly is a type having a planar stacked structure in which a plurality of electrode units each including a positive electrode, a negative electrode, and a separator is stacked. Further, in the exterior body, a spacer is provided in order to prevent electronic contact of the positive and negative electrodes and the exterior body. The positive electrode is electronically connected to a positive electrode external terminal with a positive electrode collector lead interposed therebetween. The positive electrode external terminal is fixed to the exterior body by a seal portion, and the seal portion prevents leakage of the electrolyte. Similarly, the negative electrode is electronically connected to a negative electrode external terminal with a negative electrode collector lead interposed therebetween.

The negative electrode external terminal is fixed to the exterior body by a seal portion, and the seal portion prevents leakage of the electrolyte.

The positive electrode is composed of at least a positive electrode material layer and a positive electrode current collector, and the positive electrode material layer is provided on at least one side of the positive electrode current collector. The positive electrode material layer contains a positive electrode active material as an electrode active material. The negative electrode is composed of at least a negative electrode material layer and a negative electrode current collector, and the negative electrode material layer is provided on at least one side of the negative electrode current collector. The negative electrode material layer contains a negative electrode active material as an electrode active material.

The positive electrode active material contained in the positive electrode material layer and the negative electrode active material contained in the negative electrode material layer are substances directly involved in the transfer of electrons in the secondary battery and are main substances of the positive and negative electrodes which are responsible for charging and discharging, namely a battery reaction. More specifically, ions are generated in the electrolyte by "the positive electrode active material contained in the positive electrode material layer" and "the negative electrode active material contained in the negative electrode material layer", and the ions move between the positive electrode and the negative electrode and the electrons are transferred, whereby charging and discharging are performed. It is preferable that the positive and negative electrode material layers are particularly layers capable of occluding and releasing lithium ions. In other words, preferred is a secondary battery in which lithium ions move between a positive electrode and a negative electrode through an electrolyte, thereby charging and discharging the battery. When lithium ions are involved in charging and discharging, the secondary battery according to this embodiment corresponds to a so-called "lithium ion battery".

The positive electrode active material of the positive electrode material layer is made of, for example, a granular material, and it is preferable that a binder (also referred to as "binding material") is contained in the positive electrode material layer in order to maintain a sufficient contact between particles and the shape of the particles. Further, a conductive auxiliary agent may be contained in the positive electrode material layer in order to facilitate transmission of electrons promoting the battery reaction. Similarly, when the negative electrode active material of the negative electrode material layer is made of, for example, a granular material, a binder is preferably contained in order to maintain a sufficient contact between particles and the shape of the particles, and a conductive auxiliary agent may be contained in the negative electrode material layer in order to facilitate transmission of electrons promoting the battery reaction. As described above, since a plurality of components is contained, the positive electrode material layer and the negative electrode material layer can also be referred to as "positive electrode mixture layer" and "negative electrode mixture layer", respectively.

It is preferable that the positive electrode active material is a material contributing to occlusion and release of lithium ions. From these points of view, it is preferable that the positive electrode active material is, for example, a lithium-containing composite oxide. More specifically, it is preferable that the positive electrode active material is a lithium transition metal composite oxide which contains lithium and at least one transition metal selected from the group consisting of cobalt, nickel, manganese, and iron. That is, in the positive electrode material layer of the secondary battery, the lithium transition metal composite oxide is preferably contained as the positive electrode active material. Examples of the positive electrode active material may include lithium cobaltate, lithium nickelate, lithium manganate, lithium iron phosphate, or materials in which a part of the transition metal of these is substituted with another metal. Although the positive electrode active material may be contained singly or two or more kinds thereof may be contained. In a more preferred embodiment, the positive electrode active material contained in the positive electrode material layer is lithium cobaltate.

The binder which can be contained in the positive electrode material layer is not particularly limited, but examples thereof include at least one selected from the group consisting of polyvinylidene fluoride, a vinylidene fluoride-hexafluoropropylene copolymer, a vinylidene fluoride-tetrafluoroethylene copolymer, and polytetrafluoroethylene. The conductive auxiliary agent which can be contained in the positive electrode material layer is not particularly limited, but examples thereof include at least one selected from the group consisting of carbon black such as thermal black, furnace black, channel black, ketjen black, and acetylene black; carbon fibers such as graphite, carbon nanotube, and vapor-grown carbon fiber; metal powders such as copper, nickel, aluminum, and silver; and polyphenylene derivatives. In a more preferred embodiment, the binder of the positive electrode material layer is polyvinylidene fluoride, and in another more preferred embodiment, the conductive auxiliary agent of the positive electrode material layer is carbon black. In a still more preferred embodiment, the binder and the conductive auxiliary agent in the positive electrode material layer are a combination of polyvinylidene fluoride and carbon black.

It is preferable that the negative electrode active material is a material contributing to occlusion and release of lithium ions. From these points of view, as the negative electrode active material, for example, various carbon materials, oxides, or lithium alloys are preferred.

Examples of the various carbon materials for the negative electrode active material include graphite (natural graphite and artificial graphite), hard carbon, soft carbon, and diamond-like carbon. Particularly, graphite is preferred because it has high electron conductivity and excellent adhesion to the negative electrode current collector and the like. Examples of the oxide of the negative electrode active material include at least one selected from the group consisting of silicon oxide, tin oxide, indium oxide, zinc oxide, and lithium oxide. The lithium alloy of the negative electrode active material may be any metal as long as the metal can be alloyed with lithium, and the lithium alloy may be, for example a binary, ternary or higher alloy of a metal such as Al, Si, Pb, Sn, In, Bi, Ag, Ba, Ca, Hg, Pd, Pt, Te, Zn or La and lithium. It is preferable that the structural form of the oxide is amorphous. This is because degradation due to nonuniformity such as grain boundaries or defects is unlikely to be caused.

In a more preferred embodiment, the negative electrode active material of the negative electrode material layer is artificial graphite.

The binder which can be contained in the negative electrode material layer is not particularly limited, but examples thereof include at least one kind selected from the group consisting of styrene-butadiene rubber, polyacrylic acid, polyvinylidene fluoride, polyimide-based resin, and polyamideimide-based resin. In a more preferred embodiment, the binder contained in the negative electrode material layer is a styrene-butadiene rubber. The conductive auxiliary agent which can be contained in the negative electrode material layer is not particularly limited, but examples thereof include at least one selected from the group consisting of carbon black such as thermal black, furnace black, channel black, ketjen black, and acetylene black; carbon fibers such as graphite, carbon nanotube, and vapor-grown carbon fiber; metal powders such as copper, nickel, aluminum, and silver; and polyphenylene derivatives. It is to be noted that the negative electrode material layer may contain a component caused by a thickener component (e.g., carboxymethyl cellulose) used at the time of producing the battery.

In a still more preferred embodiment, the negative electrode active material and the binder in the negative electrode material layer are a combination of artificial graphite and styrene-butadiene rubber.

The positive electrode current collector and the negative electrode current collector used for the positive electrode and the negative electrode are members that contribute to the collection and supply of electrons generated in the active material by the battery reaction. Each of the current collectors may be a sheet-like metal member and may have a porous or perforated form. For example, each of the current collectors may be a metal foil, a punching metal, a net, an expanded metal, or the like. The positive electrode current collector used for the positive electrode is preferably made of a metal foil containing at least one selected from the group consisting of aluminum, stainless steel, and nickel, and may be, for example, an aluminum foil. On the other hand, the negative electrode current collector used for the negative electrode is preferably made of a metal foil containing at least one selected from the group consisting of copper, stainless steel, and nickel, and may be, for example, a copper foil.

The separator is a member provided from the viewpoints of the prevention of short circuit due to contact between the positive and negative electrodes and the holding of the electrolyte and the like. In other words, it can be said that the separator is a member that passes ions while preventing electronic contact between the positive and negative electrodes. Preferably, the separator is a porous or microporous insulating member and has a film form due to its small thickness. Although it is merely an example, a microporous membrane made of polyolefin may be used as the separator. In this respect, the microporous membrane used as the separator may contain, for example, only polyethylene (PE) or only polyethylene (PP) as polyolefin. Further, the separator may be a stacked body composed of "a microporous membrane made of PE" and "a microporous membrane made of PP". The surface of the separator may be covered with an inorganic particle coating layer and/or an adhesive layer. The surface of the separator may have adhesive properties.

The electrolyte assists the movement of metal ions released from the electrodes (the positive and negative electrodes). The electrolyte may be a "nonaqueous" electrolyte such as an organic electrolyte or an organic solvent, or may be an "aqueous" electrolyte containing water. The secondary battery of the present invention is preferably a nonaqueous electrolyte secondary battery using an electrolyte containing a "nonaqueous" solvent and a solute as an electrolyte. The electrolyte may have a form such as a liquid form or a gel form (it is to be noted that the nonaqueous electrolyte "in a liquid form" is also referred to herein as "nonaqueous electrolyte solution").

As a specific solvent for the nonaqueous electrolyte, a solvent containing at least a carbonate is preferred. The carbonates may be cyclic carbonates and/or chain carbonates. Although not particularly limited, examples of the cyclic carbonates include at least one kind selected from the group consisting of propylene carbonate (PC), ethylene carbonate (EC), butylene carbonate (BC), and vinylene carbonate (VC). Examples of the chain carbonates include at least one kind selected from the group consisting of dimethyl carbonate (DMC), diethyl carbonate (DEC), ethyl methyl carbonate (EMC), and dipropyl carbonate (DPC). In a preferred embodiment of the present invention, a combination of cyclic carbonate and chain carbonate may be used as the nonaqueous electrolyte, and, for example, a mixture of ethylene carbonate and diethyl carbonate is used. As a solute of a specific nonaqueous electrolyte, for example, an Li salt such as $LiPF_6$ or $LiBF_4$ is preferably used.

The exterior body is usually a conductive hard case, and is composed of a main body portion and a lid portion. The main body portion is composed of a bottom portion constituting the bottom surface of the exterior body and a side portion. The main body portion and the lid portion are sealed after accommodating the electrode assembly, the electrolyte, the collector lead, and the external terminal. The sealing method is not particularly limited, and examples thereof include a laser irradiation method. As a material constituting the main body portion and the lid portion, it is possible to use any material which can constitute a hard case type exterior body in the field of the secondary battery. The material may be any material as long as electron transfer can be achieved, and examples thereof include conductive materials such as aluminum, nickel, iron, copper, and stainless steel. The dimensions of the main body portion and the lid portion are determined mainly according to the dimension of the electrode assembly, and, for example, it is preferable that the electrode assembly has a dimension such that the movement (displacement) of the electrode assembly in the exterior body is prevented when the electrode assembly is accommodated. The movement of the electrode assembly is prevented, whereby the destruction of the electrode assembly is prevented and the safety of the secondary battery is improved. The exterior body may be a flexible case such as a pouch made of a laminate film as long as the exterior body has conductivity.

It is possible to use any spacer used in the field of the secondary battery. The material constituting the spacer is not particularly limited, but examples thereof include various insulative polymers such as polyolefin (polyethylene, polypropylene), polyester (polyethylene terephthalate, polybutylene terephthalate), and acrylic polymer. Further, the spacer is not particularly limited, but may have a form of a film or a nonwoven fabric.

As the positive electrode collector lead and the negative electrode collector lead, it is possible to use any collector lead used in the field of the secondary battery. The collector leads may be made of a material which can achieve electron transfer, and are made of, for example, a conductive material such as aluminum, nickel, iron, copper, or stainless steel. The positive electrode collector lead is preferably made of aluminum, and the negative electrode collector lead is preferably made of nickel. The form of the positive electrode collector lead or the negative electrode collector lead is not particularly limited, and the form may be, for example, line-shaped or plate-shaped.

[Characteristic Part of Secondary Battery According to an Aspect of the Present Invention]

The secondary battery according to an embodiment of the present invention is characterized by the arrangement and form of positive and negative electrodes in an electrode assembly which is a constituent element thereof.

Hereinafter, the characteristics will be described. It is to be noted that, as described above, the electrode assembly includes a positive electrode, a negative electrode, and a separator disposed between the positive electrode and the negative electrode, and it is described beforehand that the following contents and drawings are focused on the positive electrode and the negative electrode.

First Embodiment

In a secondary battery according to a first embodiment of the present invention, as shown in FIG. 1, a positive electrode 10 has a curved surface 12 on a part of a peripheral surface 11 thereof in planar view. Specifically, the curved surface 12 is formed at a corner portion 13 of the positive electrode 10. Further, a negative electrode 20 has a curved surface 22 on a part of a peripheral surface 21 thereof in planar view. Specifically, the curved surface 22 is formed at a corner portion 23 of the negative electrode 20. As shown in FIG. 1, the curved surface 12 of the positive electrode 10 and the curved surface 22 of the negative electrode 20 are formed so as to be curved in the outward direction in planar view, and the curved surface 12 of the positive electrode 10 and the curved surface 22 of the negative electrode 20 are disposed so as to be adjacent to each other. Further, the negative electrode 20 is disposed so as to protrude from the positive electrode 10 so that the gap G is formed between the positive electrode 10 and the negative electrode 20 in planar view. It is to be noted that, the term "gap" as used herein refers to a portion between a top portion 12a of the curved surface 12 of the positive electrode 10 and a top portion 22a of the curved surface 22 of the negative electrode 20 in planar view as shown in FIG. 1, and the term "gap length" to be described later refers to the length of a line passing through the top portion 12a of the curved surface 12 of the positive electrode 10 and the top portion 22a of the curved surface 22 of the negative electrode 20 in planar view.

Second Embodiment

Figure 2:
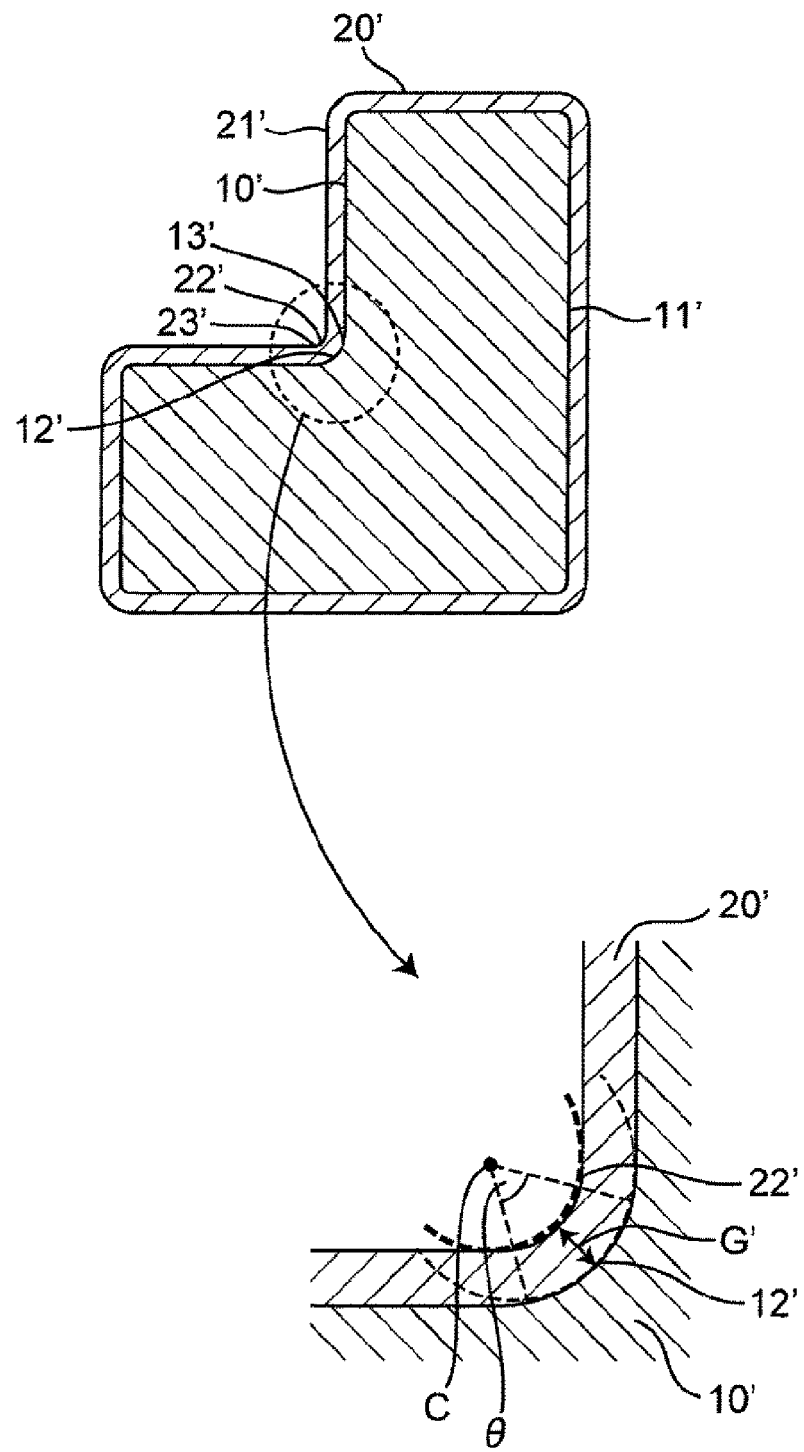
FIG. 2 is a schematic plan view showing a positional relationship between positive and negative electrodes as constituent elements of a secondary battery according to an embodiment of the present invention in planar view.

In a secondary battery according to a second embodiment of the present invention, as shown in FIG. 2, a positive electrode 10' has a curved surface 12' on a part of a peripheral surface 11' thereof in planar view. Specifically, the curved surface 12' is formed at a corner portion 13' of the positive electrode 10'. Further, a negative electrode 20' has a curved surface 22' on a part of a peripheral surface 21' thereof in planar view. Specifically, the curved surface 22' is formed at a corner portion 23' of the negative electrode 20'. As shown in FIG. 2, the curved surface 12' of the positive electrode 10' and the curved surface 22' of the negative electrode 20' are formed so as to be curved in the inward direction, and the curved surface 12' of the positive electrode 10' and the curved surface 22' of the negative electrode 20' are disposed so as to be adjacent to each other. Further, the negative electrode 20' is disposed so as to protrude from the positive electrode 10' so that a gap G' is formed between the positive electrode 10' and the negative electrode 20' in planar view. In this case, a curved angle θ of the curved surface 22' of the negative electrode 20' curved in "the inward direction" is preferably 45° to 135°, and more preferably 60° to 120° at a curvature center point C as a base point. It is to be noted that the term "curvature center point" used herein refers to a point which is equidistant from any of one end of the curved surface curved in the inward direction, the other end of the curved surface curved in the inward direction, and a midpoint between one end and the other end of the curved surface curved in the inward direction.

Third Embodiment

Figure 3:
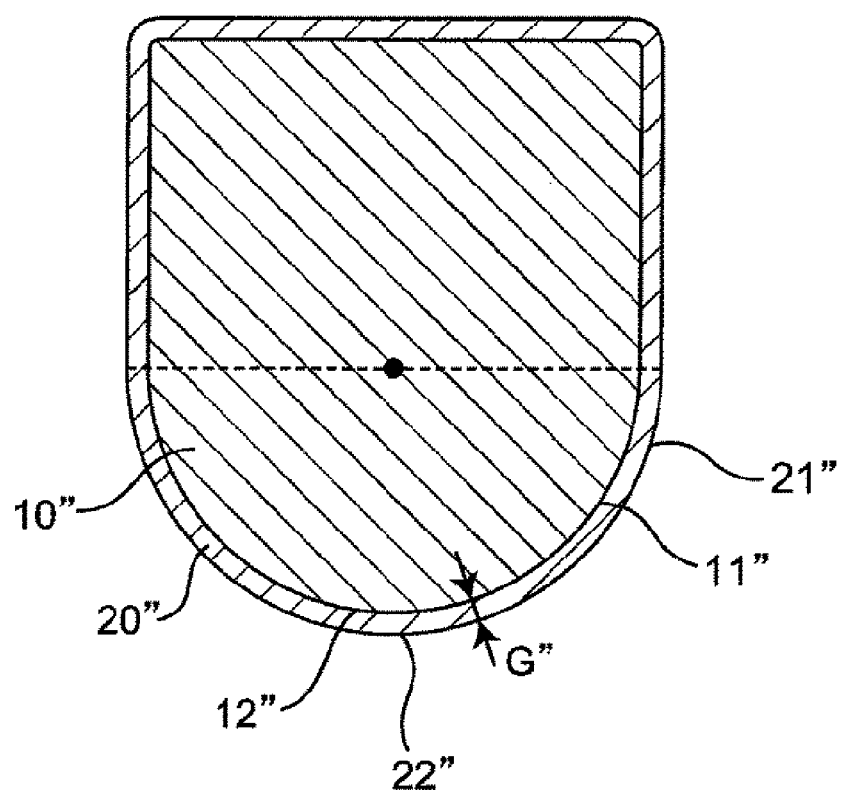
FIG. 3 is a schematic plan view showing a positional relationship between positive and negative electrodes as constituent elements of a secondary battery according to an embodiment of the present invention in planar view.

In a secondary battery according to a third embodiment of the present invention, as shown in FIG. 3, a positive electrode 10" has a curved surface 12" on a part of a peripheral surface 11" thereof in planar view. Further, a negative electrode 20" has a curved surface 22" on a part of a peripheral surface 21" thereof in planar view. As shown in FIG. 3, the curved surface 12" of the positive electrode 10" and the curved surface 22" of the negative electrode 20" are formed so as to be curved in the outward direction, and the curved surface 12" of the positive electrode 10" and the curved surface 22" of the negative electrode 20" are disposed so as to be adjacent to each other. Further, the negative electrode 20" is disposed so as to protrude from the positive electrode 10" so that a gap G" is formed between the positive electrode 10" and the negative electrode 20" in planar view.

As described in the first and third embodiments, in the case where the curved surface is curved in "the outward" direction, the curved angle θ of the curved surface of the negative electrode curved in "the outward" direction is preferably 45° to 135°, and more preferably 60° to 120° at the curvature center point C as a base point. It is to be noted that the term "curvature center point" used herein refers to a point which is equidistant from any of one end of the curved surface curved in the outward direction, the other end of the curved surface curved in the outward direction, and a midpoint between one end and the other end of the curved surface curved in the outward direction. Specifically, as shown in FIGS. 4(a) and 4(b), the term "curvature center point" refers to a point in which a distance R between the point and one end of the curved surface curved in the outward direction, a distance R' between the point and the midpoint of the curved surface curved in the outward direction, and a distance R" between the point and the other end of the curved surface curved in the outward direction are equivalent to one another. Specifically, as shown in FIG. 4(a), the term "curvature center point" refers to a point in which a distance R between the point and one end of the curved surface curved in the outward direction, a distance R' between the point and the midpoint of the curved surface curved in the outward direction, and a distance R" between the point and the other end of the curved surface curved in the outward direction are equivalent to one another.

On the other hand, as described in the second embodiment, in the case where the curved surface is curved in the "inward" direction, the curved angle θ of the curved surface of the negative electrode curved in the "inward" direction is preferably 45° to 135°, and more preferably 60° to 120° at the curvature center point C as a base point. It is to be noted that the term "curvature center point" used herein refers to a point which is equidistant from any of one end of the curved surface curved in the inward direction, the other end of the curved surface curved in the inward direction, and a midpoint between one end and the other end of the curved surface curved in the inward direction. Specifically, as shown in FIG. 4(b), the term "curvature center point" refers to a point in which a distance R between the point and one end of the curved surface curved in the inward direction, a distance R' between the point and the midpoint of the curved surface curved in the inward direction, and a distance R" between the point and the other end of the curved surface curved in the inward direction are equivalent to one another.

Here, the inventors of the present invention have extensively studied in order to prevent "a reduction in energy density of the secondary battery" which occurs when the gap (G, G', or G") between the positive electrode (10, 10', or 10") and the negative electrode (20, 20', or 20") in planar view is relatively large in the first to third embodiments.

As a result, the inventors of the present invention have found that a value obtained by dividing the absolute value $|R_1-R_2|$ of the difference between the curvature radius $R_1$ of the curved surface of the negative electrode and the curvature radius $R_2$ of the curved surface of the positive electrode by the gap G (hereinafter referred to as "$|R_1-R_2|/G$") is within a predetermined range so that it is possible to suitably achieve "a high energy density of the secondary battery" and to enable the prevention of "the short circuit between the positive electrode and the negative electrode". As shown in FIGS. 4(a) and 4(b), the term "curvature radius" used herein refers to a length which is equidistant from any of one end of the curved surface, the other end of the curved surface, and the midpoint between one end and the other end of the curved surface.

Specifically, the inventors of the present invention have found that when the curvature radius $R_1$ of the curved surface of the negative electrode is equal to the curvature radius $R_2$ of the curved surface of the positive electrode and thus $|R_1-R_2|/G$ is zero, the capacity is "100%", as can be seen from Examples 1 to 4 below, when $|R_1-R_2|/G$ is in the range of 0.50 to 1.10, the capacity becomes relatively high. It is to be noted that the curvature radius $R_1$ in this case is preferably 3.0 mm to 500 mm. When the capacity is relatively high, it is possible to increase the energy density of the secondary battery.

Further, the length of the gap G is preferably 0.5 mm to 2.0 mm from the viewpoints of minimizing the portion which is not used as the negative electrode as much as possible and reducing the occurrence of short circuit of the positive and negative electrodes caused by the displacement of the electrodes (the positive and negative electrodes) and the separator when an impact is applied from the outside.

Although not illustrated, in the secondary battery according to an embodiment of the present invention, the exterior body has an exterior body curved surface which is adjacent to the curved surface of the negative electrode on a part of a peripheral surface in planar view. In an embodiment, when the curved surface of the exterior body, the curved surface of the positive electrode, and the curved surface of the negative electrode are curved in the outward direction, a curvature radius $R_3$ of the curved surface of the exterior body is preferably larger than the curvature radius $R_1$ of the curved surface of the negative electrode from the viewpoint of enclosing the electrode assembly in the exterior body. On the other hand, in another embodiment, when the curved surface of the exterior body, the curved surface of the positive electrode, and the curved surface of the negative electrode are curved in the inward direction, the curvature radius $R_3$ of the curved surface of the exterior body is preferably smaller than the curvature radius $R_1$ of the curved surface of the negative electrode from the viewpoint of enclosing the electrode assembly in the exterior body.

EXAMPLES

Example 1

(G: 0.5 mm, $R_1$: 3.0 mm, in the case where the curved surface 12 of the positive electrode 10 and the curved surface 22 of the negative electrode 20 are curved in the outward direction at the corner portion (see FIG. 1))

The capacity when $|R_1-R_2|/G$ was zero was "100%", and simulation analysis was performed on the capacity ratio when the value of the curvature radius $R_2$ of the curved surface 12 of the positive electrode 10 was changed. The results are shown in Table 1.

TABLE 1

| G (mm) | $R_1$ (mm) | $R_2$ (mm) | $|R_1 - R_2|/G$ | Capacity ratio when $R_1$ is equal to $R_2$ |
| --- | --- | --- | --- | --- |
| 0.5 | 3.0 | 3.00 | 0.00 | 100.0% |
| 0.5 | 3.0 | 2.75 | 0.50 | 100.1% |
| 0.5 | 3.0 | 2.65 | 0.70 | 100.2% |
| 0.5 | 3.0 | 2.55 | 0.90 | 100.3% |
| 0.5 | 3.0 | 2.53 | 0.95 | 100.3% |
| 0.5 | 3.0 | 2.50 | 1.00 | 100.3% |
| 0.5 | 3.0 | 2.48 | 1.05 | 100.2% |
| 0.5 | 3.0 | 2.45 | 1.10 | 100.1% |
| 0.5 | 3.0 | 2.40 | 1.20 | 99.9% |
| 0.5 | 3.0 | 2.25 | 1.50 | 99.4% |

As can be seen from Table 1, it is found that when $|R_1-R_2|/G$ is in the range of 0.50 to 1.10, the capacity is relatively larger than the capacity when $|R_1-R_2|/G$ is zero.

Example 2

(G: 1.0 mm, $R_1$: 20.0 mm, in the case where the curved surface 12' of the positive electrode 10' and the curved surface 22' of the negative electrode 20' are curved in the inward direction (see FIG. 2))

The capacity when $|R_1-R_2|/G$ was zero was "100%", and simulation analysis was performed on the capacity ratio when the value of the curvature radius $R_2$ of the curved surface 12' of the positive electrode 10' was changed. The results are shown in Table 2.

TABLE 2

| G (mm) | $R_1$ (mm) | $R_2$ (mm) | $|R_1 - R_2|/G$ | Capacity ratio when $R_1$ is equal to $R_2$ |
| --- | --- | --- | --- | --- |
| 1.0 | 20.0 | 20.0 | 0.00 | 100.00% |
| 1.0 | 20.0 | 20.5 | 0.50 | 100.06% |
| 1.0 | 20.0 | 20.7 | 0.70 | 100.09% |
| 1.0 | 20.0 | 20.9 | 0.90 | 100.11% |
| 1.0 | 20.0 | 21.0 | 0.95 | 100.12% |
| 1.0 | 20.0 | 21.0 | 1.00 | 100.12% |
| 1.0 | 20.0 | 21.1 | 1.05 | 100.09% |
| 1.0 | 20.0 | 21.1 | 1.10 | 100.06% |
| 1.0 | 20.0 | 21.2 | 1.20 | 99.99% |
| 1.0 | 20.0 | 21.5 | 1.50 | 99.79% |

As can be seen from Table 2, it is found that when $|R_1-R_2|/G$ is in the range of 0.50 to 1.10, the capacity is relatively larger than the capacity when $|R_1-R_2|/G$ is zero.

Example 3

(G: 2.0 mm, $R_1$: 10.0 mm, in the case where the curved surface 12" of the positive electrode 10" and the curved surface 22" of the negative electrode 20" are curved in the outward direction (see FIG. 3))

The capacity when $|R_1-R_2|/G$ was zero was "100%", and simulation analysis was performed on the capacity ratio when the value of the curvature radius $R_2$ of the curved surface 12" of the positive electrode 10" was changed. The results are shown in Table 3.

TABLE 3

| G (mm) | $R_1$ (mm) | $R_2$ (mm) | $|R_1 - R_2|/G$ | Capacity ratio when $R_1$ is equal to $R_2$ |
|---|---|---|---|---|
| 2.0 | 10.0 | 10.0 | 0.00 | 100.0% |
| 2.0 | 10.0 | 9.0 | 0.50 | 106.6% |
| 2.0 | 10.0 | 8.6 | 0.70 | 111.1% |
| 2.0 | 10.0 | 8.2 | 0.90 | 119.1% |
| 2.0 | 10.0 | 8.1 | 0.95 | 122.8% |
| 2.0 | 10.0 | 8.0 | 1.00 | 133.6% |
| 2.0 | 10.0 | 7.9 | 1.05 | 132.1% |
| 2.0 | 10.0 | 7.8 | 1.10 | 130.6% |
| 2.0 | 10.0 | 7.6 | 1.20 | 127.5% |
| 2.0 | 10.0 | 7.0 | 1.50 | 118.2% |

As can be seen from Table 3, it is found that when $|R_1-R_2|/G$ is in the range of 0.50 to 1.10, the capacity is relatively larger than the capacity when $|R_1-R_2|/G$ is zero.

Example 4

(G: 1.5 mm, $R_1$: 150.0 mm, in the case where the curved surface 12" of the positive electrode 10" and the curved surface 22" of the negative electrode 20" are curved in the outward direction (see FIG. 3))

The capacity when $|R_1-R_2|/G$ was zero was "100%", and simulation analysis was performed on the capacity ratio when the value of the curvature radius $R_2$ of the curved surface 12" of the positive electrode 10" was changed. The results are shown in Table 4.

TABLE 4

| G (mm) | $R_1$ (mm) | $R_2$ (mm) | $|R_1 - R_2|/G$ | Capacity ratio when $R_1$ is equal to $R_2$ |
|---|---|---|---|---|
| 1.5 | 150.0 | 150.0 | 0.00 | 100.0% |
| 1.5 | 150.0 | 149.3 | 0.50 | 102.1% |
| 1.5 | 150.0 | 149.0 | 0.70 | 103.3% |
| 1.5 | 150.0 | 148.7 | 0.90 | 105.1% |
| 1.5 | 150.0 | 148.6 | 0.95 | 105.8% |
| 1.5 | 150.0 | 148.5 | 1.00 | 107.7% |
| 1.5 | 150.0 | 148.4 | 1.05 | 107.6% |
| 1.5 | 150.0 | 148.4 | 1.10 | 107.6% |
| 1.5 | 150.0 | 148.2 | 1.20 | 107.5% |
| 1.5 | 150.0 | 147.8 | 1.50 | 107.2% |

As can be seen from Table 4, it is found that when $|R_1-R_2|/G$ is in the range of 0.50 to 1.10, the capacity is relatively larger than the capacity when $|R_1-R_2|/G$ is zero.

The secondary battery according to an embodiment of the present invention can be used in various fields in which electricity storage is expected. Although the followings are merely examples, the secondary battery according to an embodiment of the present invention, particularly the non-aqueous electrolyte secondary battery can be used in electricity, information and communication fields where mobile devices are used (e.g., mobile device fields, such as mobile phones, smart phones, laptop computers, and digital cameras), domestic and small industrial applications (e.g., the fields such as electric tools, golf carts, domestic robots, caregiving robots, and industrial robots), large industrial applications (e.g., the fields such as forklifts, elevators, and harbor cranes), transportation system fields (e.g., the fields such as hybrid vehicles, electric vehicles, buses, trains, electric assisted bicycles, and two-wheeled electric vehicles), electric power system applications (e.g., the fields such as various power generation systems, load conditioners, smart grids, home-installation type power storage systems), and space and deep sea applications (e.g., the fields such as spacecraft and research submarines).

DESCRIPTION OF REFERENCE SYMBOLS

10: Positive electrode
10': Positive electrode
10": Positive electrode
11: Peripheral surface of positive electrode
11': Peripheral surface of positive electrode
11": Peripheral surface of positive electrode
12: Curved surface of positive electrode
12': Curved surface of positive electrode
12": Curved surface of positive electrode
13: Corner portion of positive electrode
13': Corner portion of positive electrode
20: Negative electrode
20': Negative electrode
20': Negative electrode
21: Peripheral surface of negative electrode
21': Peripheral surface of negative electrode
21": Peripheral surface of negative electrode
22: Curved surface of negative electrode
22': Curved surface of negative electrode
22": Curved surface of negative electrode
23: Corner portion of negative electrode
23': Corner portion of negative electrode
C: Curvature center point
θ: Curved angle
G: Gap

The invention claimed is:
1. A secondary battery comprising:
an exterior body defining an interior space;
an electrode assembly within the interior space, the electrode assembly including a positive electrode, a negative electrode, and a separator disposed between the positive electrode and the negative electrode; and
an electrolyte within the interior space,
wherein
the positive electrode and the negative electrode have curved surfaces adjacent to each other on parts of peripheral surfaces thereof when viewed in in a planar view of the secondary battery, and the curved surfaces are curved in an inward direction relative to a center of the secondary battery and in a same direction relative to a curvature center point,
the negative electrode protrudes from the positive electrode so that a gap is present between the positive electrode and the negative electrode in the planar view,
$(|R_1-R_2|/G)$ is 0.50 to 1.10, where $R_1$ is a curvature radius of the curved surface of the negative electrode from the curvature center point, $R_2$ is a curvature radius of the curved surface of the positive electrode from the curvature center point, and G is a length of the gap,
the exterior body has an exterior body curved surface which is adjacent to the curved surface of the negative electrode on a part of a peripheral surface of the exterior body in the planar view, and
the exterior body curved surface is curved in the inward direction relative to the center of the secondary battery and in a same direction relative to the curvature center point, and a curvature radius $R_3$ of the exterior body curved surface from the curvature center point is smaller than the curvature radius $R_1$ of the curved surface of the negative electrode.

2. The secondary battery according to claim 1, wherein a plurality of electrode assemblies are stacked within the interior space.

3. The secondary battery according to claim 2, wherein G is 0.5 mm to 2.0 mm.

4. The secondary battery according to claim 1, wherein G is 0.5 mm to 2.0 mm.

5. The secondary battery according to claim 1, wherein $R_1$ is 3.0 mm to 500 mm.

6. The secondary battery according to claim 2, wherein $R_1$ is 3.0 mm to 500 mm.

7. The secondary battery according to claim 3, wherein $R_1$ is 3.0 mm to 500 mm.

8. The secondary battery according to claim 4, wherein $R_1$ is 3.0 mm to 500 mm.

9. The secondary battery according to claim 1, wherein a curved angle θ of the curved surface of the negative electrode is 45° to 135° at a curvature center point C as a base point.

10. The secondary battery according to claim 1, wherein a curved angle θ of the curved surface of the negative electrode is 60° to 120° at a curvature center point C as a base point.

11. The secondary battery according to claim 1, wherein the positive electrode and the negative electrode each are made from a material capable of occluding and releasing lithium ions.

12. The secondary battery according to claim 1, wherein the positive electrode includes a lithium transition metal composite oxide which contains lithium and at least one transition metal selected from the cobalt, nickel, manganese, and iron as a positive electrode active material, and the negative electrode includes a carbon material as a negative electrode active material.

* * * * *